(12) United States Patent
Park

(10) Patent No.: US 10,680,784 B2
(45) Date of Patent: *Jun. 9, 2020

(54) METHOD AND APPARATUS FOR CONTROLLING DOWNLINK HARQ TIMING IN TDD ENVIRONMENT

(71) Applicant: Apple Inc., Cupertino, CA (US)

(72) Inventor: Dong Hyun Park, Seoul (KR)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/269,862

(22) Filed: Feb. 7, 2019

(65) Prior Publication Data

US 2019/0173650 A1 Jun. 6, 2019

Related U.S. Application Data

(63) Continuation of application No. 14/910,798, filed as application No. PCT/KR2014/007372 on Aug. 8, 2014, now Pat. No. 10,237,040.

(30) Foreign Application Priority Data

Aug. 8, 2013 (KR) .......................... 10-2013-0094389

(51) Int. Cl.
*H04L 5/00* (2006.01)
*H04L 1/18* (2006.01)
(Continued)

(52) U.S. Cl.
CPC .......... *H04L 5/0055* (2013.01); *H04L 1/1854* (2013.01); *H04L 5/001* (2013.01);
(Continued)

(58) Field of Classification Search
CPC ..... H04L 5/0055; H04L 5/1469; H04L 5/001; H04L 5/0028; H04L 1/1854;
(Continued)

(56) References Cited

U.S. PATENT DOCUMENTS

2012/0327821 A1  12/2012  Lin et al.
2013/0194981 A1   8/2013  Wang et al.
(Continued)

FOREIGN PATENT DOCUMENTS

WO    2012-108720    8/2012
WO    2012-124996    9/2012

OTHER PUBLICATIONS

International Search Report dated Dec. 2, 2014, in International Patent Application No. PCT/KR2014/007372.
(Continued)

*Primary Examiner* — Dady Chery
(74) *Attorney, Agent, or Firm* — Kowert, Hood, Munyon, Rankin & Goetzel, P.C.

(57) ABSTRACT

The present specification relates to a method and an apparatus for controlling downlink HARQ timing. A method for controlling downlink HARQ timing according to an embodiment of the present invention comprises the steps of: configuring, by a base station, different duplex modes for a PCell and an SCell and transmitting the configuration information to a terminal; transmitting, by the base station, a PDSCH in subframe n-k of the SCell; and receiving, by the base station, HARQ response information from the terminal in subframe n of the PCell by applying a set index associated with downlink HARQ timing corresponding to the configuration information, wherein k has a value of 4-13.

20 Claims, 18 Drawing Sheets

(51) Int. Cl.
  *H04L 5/14* (2006.01)
  *H04W 72/04* (2009.01)
  *H04W 84/04* (2009.01)
  *H04W 88/08* (2009.01)

(52) U.S. Cl.
  CPC .......... *H04L 5/0028* (2013.01); *H04L 5/1469* (2013.01); *H04W 72/0446* (2013.01); *H04L 1/1887* (2013.01); *H04W 72/042* (2013.01); *H04W 84/042* (2013.01); *H04W 88/08* (2013.01)

(58) Field of Classification Search
  CPC ............ H04L 1/1887; H04W 72/0446; H04W 72/042; H04W 88/08; H04W 84/042
  See application file for complete search history.

(56) References Cited

U.S. PATENT DOCUMENTS

2013/0315114 A1   11/2013   Seo et al.
2014/0003303 A1   1/2014    Yang et al.

OTHER PUBLICATIONS

Nokia Corporation, "NEW WI; LTE TDD-FDD Joint Operation—Core Part", RP-130888, 3GPP TSG RAN meeting #60, Oranjestad, Aruba, Jun. 11-14, 2013.

FIG.3
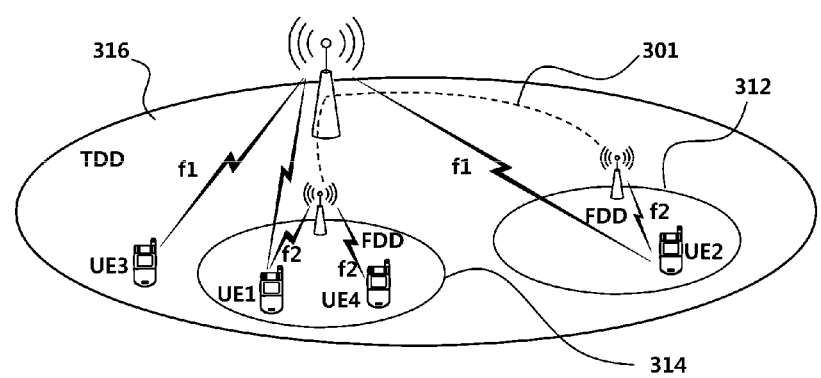
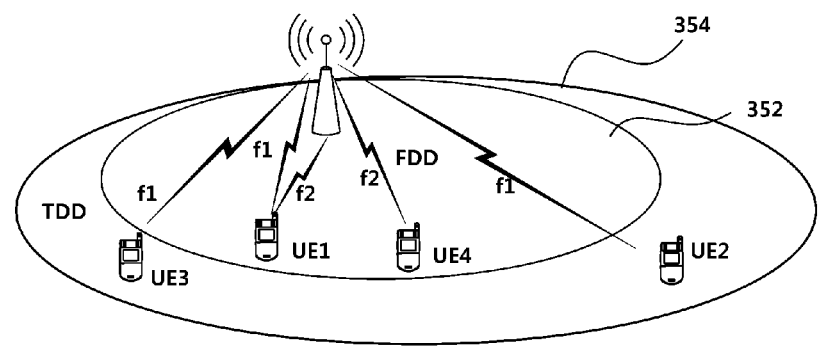

METHOD AND APPARATUS FOR CONTROLLING DOWNLINK HARQ TIMING IN TDD ENVIRONMENT

PRIORITY CLAIM

This application claims priority to U.S. patent application Ser. No. 14/910,798, entitled "Method and Apparatus for Controlling Downlink HARQ Timing in TDD Environment", filed Mar. 30, 2016, which is a 371 of International PCT/KR2014/007372, filed Aug. 8, 2014, and claims priority to Korean Patent Application No. 10-2013-0094389, filed on Aug. 8, 2013 each of which is hereby incorporated by reference in its entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

The present invention relates to a method and apparatus for controlling a downlink HARQ timing in a TDD environment, and more particularly, to a method and apparatus for controlling a downlink HARQ timing of a CA system.

BACKGROUND ART

As communication systems have developed, various wireless terminals have been utilized by consumers, including companies and individuals. A current mobile communication system affiliated with 3GPP (for example, LTE (Long Term Evolution), LTE-A (LTE-Advanced), and the like) may be a high-speed and high capacity communication system that is capable of transmitting and receiving various data (such as image data, wireless data, and the like) beyond providing a sound-based service. Accordingly, there is a desire for a technology that transmits high capacity data that is comparable to a wired communication network. Data may be efficiently transmitted through a plurality of component carriers as a scheme for transmitting high capacity data. In a TDD (Time Division Duplex) system, transmission (Tx) and Reception (Rx) may be executed using a predetermined frequency band. In this instance, Tx and Rx of data may be executed by being distinguished based on a time slot.

Conventionally, all of the serving cells are configured based on an identical TDD UL-DL configuration, and thus, adjustment between cells may not be needed. However, when different TDD configurations are configured for different carriers, or when a predetermined cell is configured as FDD and the other cell is configured as TDD, additional handling may be required since the TDD uplink/downlink subframe is limited in terms of time. That is, there is a desire for a method of controlling a downlink HARQ timing of a CA system.

DETAILED DESCRIPTION OF THE INVENTION

Technical Problem

The present invention is to control the downlink HARQ timing in a TDD environment.

Particularly, the present invention proposes a method of controlling the downlink HARQ timing of an FDD/TDD CA system under the LTE-A circumstance and an apparatus implementing the same.

Also, the present invention provides a downlink HARQ timing to be embodied in an S Cell when the duplex mode of a PCell and the duplex mode of an SCell are different, so as to reduce the feedback delay of the SCell.

Technical Solution

According to an embodiment of the present disclosure, there is provided a method of controlling a downlink HARQ timing, the method including: configuring, by a Base Station (BS), a duplex mode of a PCell and a duplex mode of an SCell to be different from each other, and transmitting configuration information to a User Equipment (UE); transmitting, by the BS, a PDSCH in a subframe n-k of the SCell; and receiving, by the BS, HARQ response information in a subframe n of the PCell from the UE by applying an association set index of a downlink HARQ timing corresponding to the configuration information, wherein k has a value that is greater than or equal to 4 and less than or equal to 13.

According to an embodiment of the present disclosure, there is provided a method of controlling a downlink HARQ timing, the method including: receiving, by a UE from a BS, configuration information that configures a duplex mode of a PCell and a duplex mode of an SCell to be different from each other; receiving, by the UE, a PDSCH in a subframe n-k of the SCell; and transmitting, by the UE, HARQ response information (HARQ Acknowledgement) in a subframe n of the PCell by applying an association set index of a downlink HARQ timing corresponding to the configuration information, wherein k has a value that is greater than or equal to 4 and less than or equal to 13.

According to an embodiment of the present disclosure, there is provided a BS that controls a downlink HARQ timing in a TDD environment, the BS including: a transmitting unit that transmits information or a signal to a UE; a receiving unit that receives HARQ response information from the UE; and a controller that configures a duplex mode of a PCell and a duplex mode of an SCell to be different from each other, and controls the transmitting unit to transmit the configuration information to the UE, wherein the controller controls the transmitting unit to transmit a PDSCH in a subframe n-k of the SCell; and controls the receiving unit to receive HARQ response information in a subframe n of the PCell from the UE by applying an association set index of a downlink HARQ timing corresponding to the configuration information, and k has a value that is greater than or equal to 4 and less than or equal to 13.

According to an embodiment of the present disclosure, there is provided a UE that controls a downlink HARQ timing in a TDD environment, the UE including: a receiving unit that receives, from a BS, configuration information that configures a duplex mode of a PCell and a duplex mode of an SCell to be different from each other, and receives a PDSCH in a subframe n-k of the SCell; a transmitting unit that transmits information or a signal to the BS; and a controller that controls the transmitting unit to transmit HARQ response information in a subframe n of the PCell by applying an association set index of a downlink HARQ timing corresponding to the configuration information, wherein k has a value that is greater than or equal to 4 and less than or equal to 13.

Advantageous Effects

According to the present invention, in a network environment where CA is supported among serving cells configured as different duplex modes (FDD or TDD), a User Equipment (UE) may reduce a feedback delay and may transmit downlink HARQ response information, thereby improving the performance of a system.

BRIEF DESCRIPTION OF THE DRAWINGS

FIG. 3 is a diagram illustrating a TDD-FDD CA scenario to which an embodiment of the present invention is applicable;

MODE FOR CARRYING OUT THE INVENTION

Figure 1:
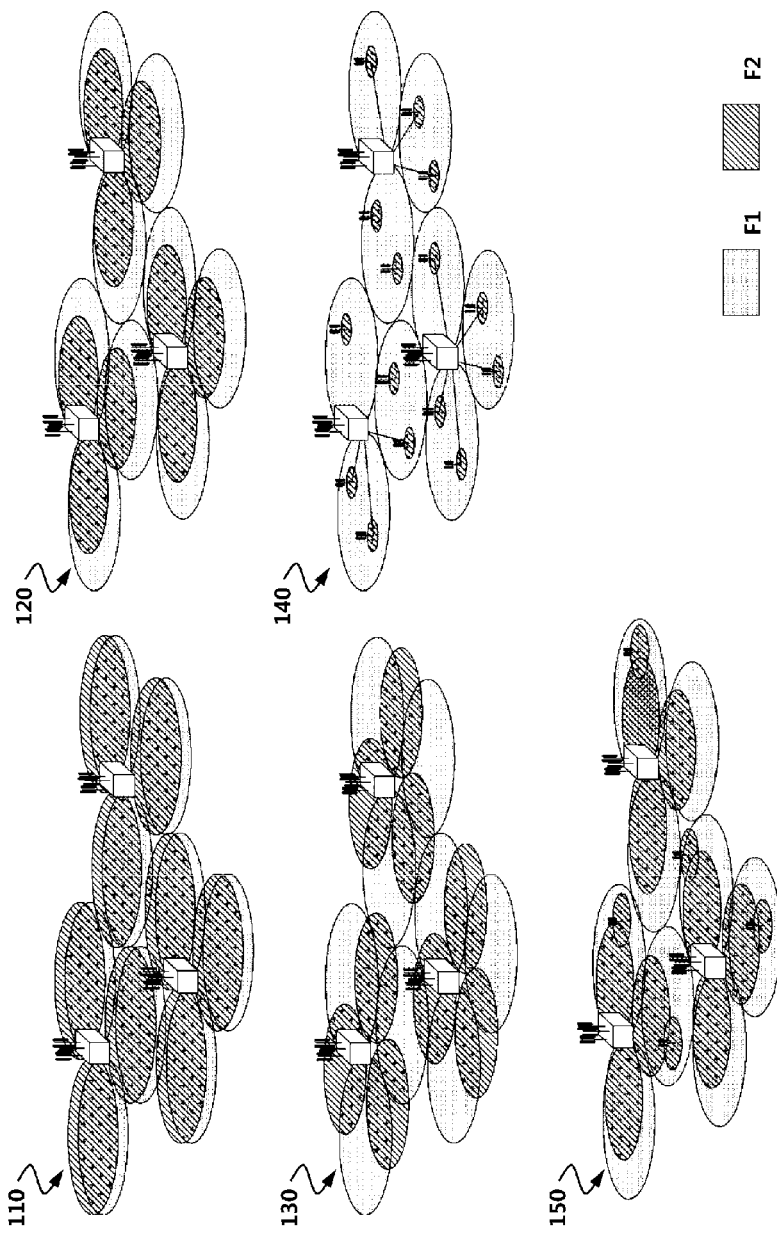
FIG. 1 illustrates a CA (Carrier Aggregation) deployment scenario according to an embodiment of the present invention.

Hereinafter, embodiments of the present invention will be described in detail with reference to the accompanying drawings. In the following description, the same components will be designated by the same reference numerals although they are shown in different drawings. Further, in the following description of the present invention, a detailed description of known functions and configurations incorporated herein will be omitted when it may make the subject matter of the present invention rather unclear.

The wireless communication system may include a User Equipment (UE) and a Base Station (BS or an eNB). Throughout the specifications, the user equipment may be an inclusive concept indicating a user terminal utilized in wireless communication, including a UE (User Equipment) in WCDMA, LTE, HSPA, and the like, and an MS (Mobile station), a UT (User Terminal), an SS (Subscriber Station), a wireless device, and the like in GSM.

The base station or a cell, may generally refer to a station where communication with the user equipment is performed, and may also be referred to as a Node-B, an eNB (evolved Node-B), a Sector, a Site, a BTS (Base Transceiver System), an Access Point, a Relay Node, and the like.

That is, the base station or the cell may be construed as an inclusive concept indicating a portion of an area covered by a BSC (Base Station Controller) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, and the like.

In the specification, the user equipment and the base station are used as two (uplink or downlink) inclusive transceiving subjects to embody the technology and technical concepts described in the specifications, and may not be limited to a predetermined term or word.

In a system, such as LTE and LTE-A, to which the present invention may be applied, a standard may be developed by configuring an uplink and a downlink based on a single carrier or a pair of carriers. The uplink and the downlink may transmit control information through a control channel, such as a PDCCH (Physical Downlink Control CHannel), a PCFICH (Physical Control Format Indicator CHannel), a PITCH (Physical Hybrid ARQ Indicator CHannel), a PUCCH (Physical Uplink Control CHannel), and the like, and may be configured as a data channel, such as a PDSCH (Physical Downlink Shared CHannel), a PUSCH (Physical Uplink Shared CHannel), and the like, so as to transmit data.

The abbreviations that are used throughout the present specification will be described as follows:

PCell: Primal)/serving cell

SCell: Secondary serving cell

Uplink transmission and downlink transmission may be performed based on a TDD (Time Division Duplex) scheme that performs transmission based on different times, or based on an FDD (Frequency Division Duplex) scheme that performs transmission based on different frequencies. Meanwhile, a timepoint of a downlink and a timepoint of an uplink may be distinguished in TDD, and when various TDD configurations exist, timepoints may be varied.

Table 1 provided below shows TDD configurations. It shows that the UL-DL subframe transmission timing is different for each TDD configuration.

TABLE 1

| Uplink-downlink configurations | | | | | | | | | | | |
|---|---|---|---|---|---|---|---|---|---|---|---|
| Uplink-downlink config-uration | Downlink-to-Uplink Switch-point periodicity | Subframe number | | | | | | | | | |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, in a radio frame corresponding to 10 subframes, a region marked with D denotes a downlink and a region marked with U denotes an uplink. S denotes a special subframe that is switched from a downlink to an uplink (Downlink-to-Uplink Switch-point periodicity).

Table 2 shows a downlink association set index K in a TDD mode. K is $\{k_0, k_1, \ldots, k_{M-1}\}$.

TABLE 2

| UL-DL Configuration | Downlink association set index K: {k₀, k₁, . . . , k_{M−1}}, in TDD Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Based on a UL-DL configuration, an uplink subframe that is associated with a downlink subframe may be changed. For example, according to UL-DL configuration #3, a subframe 2 is an uplink subframe and is associated with downlink subframes that are received 7, 6, and 11 subframes before the uplink subframe 2. ACK/NACK information with respect to the downlink subframes that are received 7, 6, and 11 subframes before the uplink subframe 2 may be transmitted through the uplink subframe 2. When one of the TDD UL-DL configurations is used, a User Equipment (UE) may be aware, in advance, of whether a downlink or an uplink is to be used at a corresponding timepoint. The information enables the UE to execute a prediction and to operate.

In all of the UL subframes (UL subframe n) of a UE that is configured with FDD, HARQ response information (HARQ acknowledgement) with respect to a DL subframe n−4, which is transmitted k=4 subframes before the UL subframe n, may be transmitted. Hereinafter, a UL subframe through which HARQ response information with respect to a DL subframe is transmitted, may be referred to as a UL subframe associated with the DL subframe.

Also, the HARQ response information takes a HARQ-ACK as an example, and has one of ACK and NACK through HARQ as a value. Alternatively, according to an embodiment, the HARQ response information may have a third value in addition to ACK and NACK FIG. 1 illustrates a CA (Carrier Aggregation) deployment scenario according to an embodiment of the present invention.

The diagram 110 shows that F1 and F2 coexist and overlap, and provide almost the same coverage. F1 and F2 indicate carrier frequency bands. The two layers may provide sufficient coverage and mobility, and F1 and F2 may be formed of an identical band.

The diagram 120 shows that F1 and F2 coexist and overlap, and F2 provides a relatively smaller coverage due to a path loss. F1 provides a sufficient coverage, and F2 improves throughput. F1 and F2 may be formed of different bands than each other.

The diagram 130 shows that F1 and F2 coexist, and an F2 antenna is located in the cell boundary of F1, thereby improving the throughput of the cell boundary. F1 and F2 may be formed of different bands than each other.

The diagram 140 shows that F1 provides macro coverage, and F2 uses an RRH and improves the throughput as being a hotspot. F1 and F2 may be formed of different bands than each other. An F2-based RRH may be combined with an F1 macro cell.

The diagram 150 is similar to the diagram 120, but shows an example in which a frequency selective repeater is deployed and the coverage is enlarged. F1 and F2 may be aggregated so that the coverages overlap by an identical eNB.

The case in which frequency bands F1 and F2 operate based on different duplex modes in the CA (for example, the case in which one frequency band operates based on TDD and the other frequency band operates based on FDD) is referred to as a TDD-FDD CA.

Figure 2:
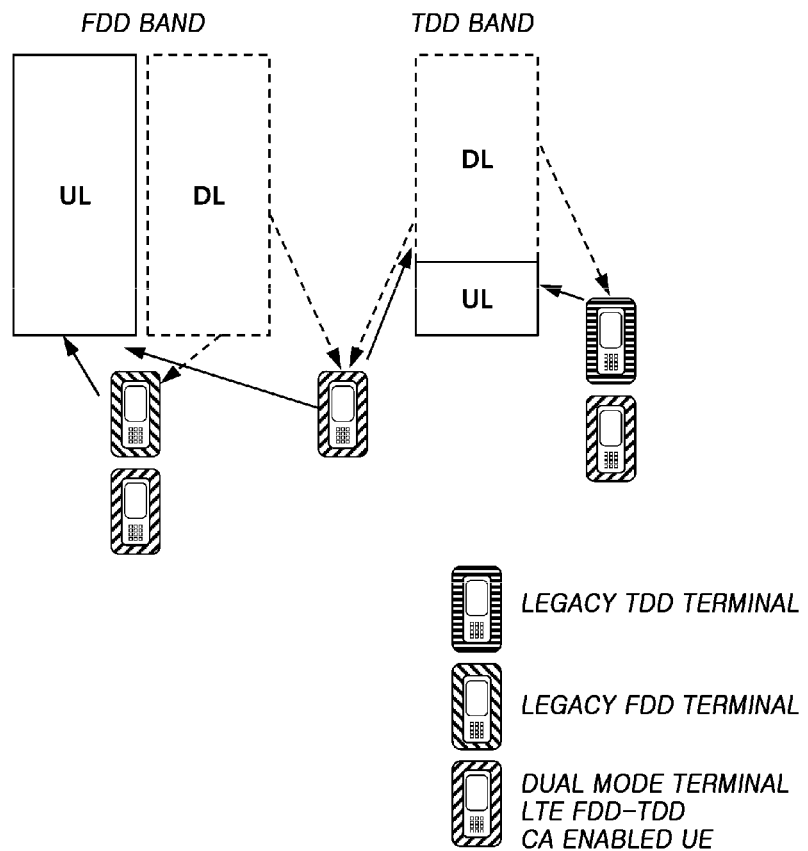
FIG. 2 illustrates a TDD-FDD CA scenario.

FIG. 2 illustrates a TDD-FDD CA scenario.

In FIG. 2, operations should be possible based on CA scenarios 1 to 4 110, 120, 130, and 140 of FIG. 1. Any one of FDD and TDD may serve as a PCell. Although a network is capable of supporting TDD-FDD CA, the legacy FDD UEs may camp on a single FDD Also, although the network is capable of supporting TDD-FDD CA, the legacy TDD UEs may camp on a single TDD cell.

FIG. 3 is a diagram illustrating a TDD-FDD CA scenario to which an embodiment of the present invention is applicable.

In the scenario shown in FIG. 3, a macro operates based on TDD in an f1 carrier 316 and 354, and a small cell operates based on FDD in an f2 carrier 312, 314, and 352. The opposite scenario (for example, the case in which the macro operates based on FDD (f1) and the small cell operates based on TDD (f2)) may also be considered. Here, the macro and the small cell are based on an ideal backhaul 301, and may be considered as an environment similar to CA scenario #4. Also, it is assumed that a PUCCH transmission of a HARQ (Hybrid Automatic Retransmit reQuest) Acknowledgement/Negative Acknowledgement (A/N) transmission with respect to a DL PDSCH transmission is transmitted in a PCell as usual.

In the scenario, the situation in which a TDD-FDD CA UE is configured with CIF or not may be additionally considered.

Figure 4:
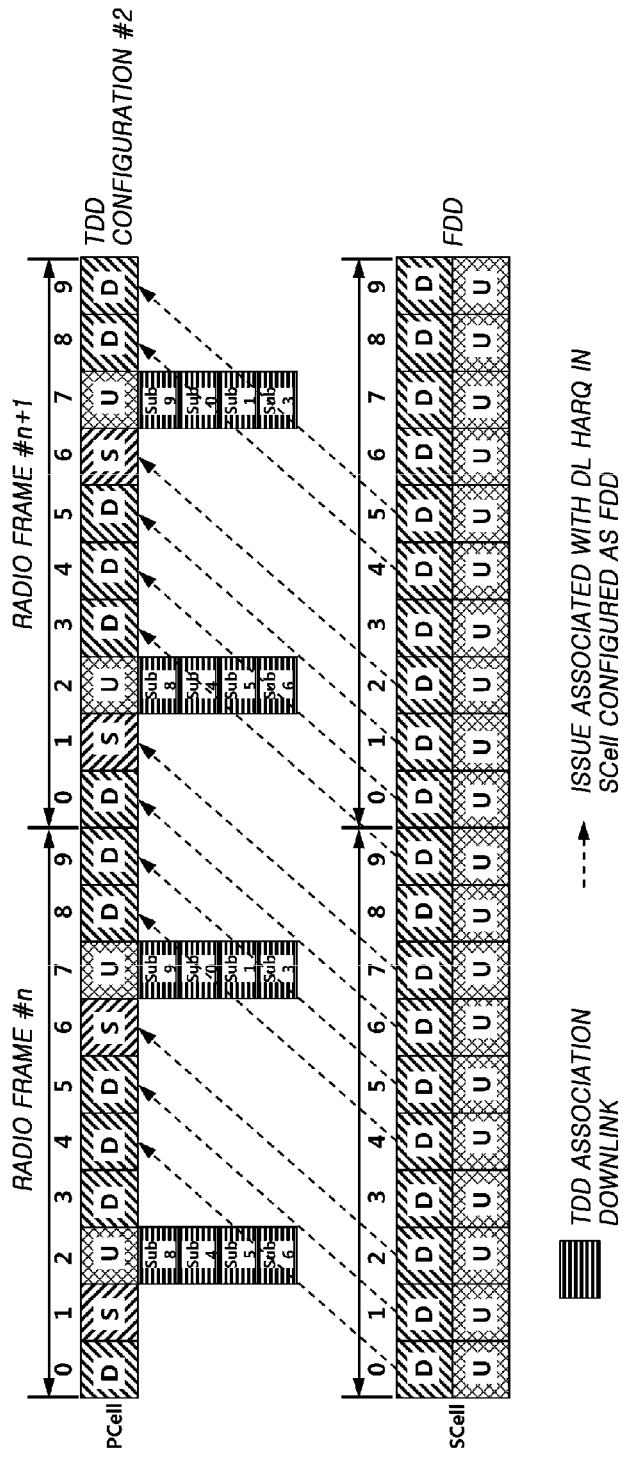
FIG. 4 is a diagram illustrating a HARQ response information feedback under a TDD-FDD CA configuration.

FIG. 4 is a diagram illustrating a HARQ response information feedback under a TDD-FDD CA configuration.

FIG. 4 illustrates that an additional consideration is required in association with a DL HARQ transmission in a deployment environment in which a PCell is configured with TDD and an SCell is configured with FDD. For example, a large number of DL subframes of an FDD SCC cell are not capable of supporting HARQ A/N bits based on an existing FDD DL HARQ timing in a UL subframe of the PCell configured with TDD. Therefore, an additional consideration is required in association with the above drawback.

Accordingly, the present specification suggests a DL association set preferred by an SCC FDD based on each PCC_TDD UL-DL configuration by taking into consideration a feedback delay, a load balancing of feedback bits, support of peak data rate, standard impact, or the like when determining a timing.

FIGS. 5 to 11 are diagrams illustrating a downlink association set when the duplex mode of a PCell is a TDD mode and the duplex mode of an SCell is an FDD mode according to an embodiment of the present invention.

Hereinafter, unlike a PCC_TDD, an SCC_FDD in FIGS. 5 to 11 needs to transmit A/N with respect to all PDSCH transmissions executed in an SCell, in a TDD UL subframe corresponding to the PCell, since DL/UL are simultaneously executed in all subframes. Therefore, the TDD of the PCell may operate based on a DL HARQ timing that is appropriate for a corresponding TDD UL-DL configuration, and a plurality of following methods may be used for FDD. P that includes a pattern of horizontal solid line indicates a subframe through which A/N is transmitted in a PCell (e.g., PUCCH). D indicates a PDSCH. P marked on an SCell is for reference, and A/N transmission is actually executed in a PCell UL subframe.

Figure 5:
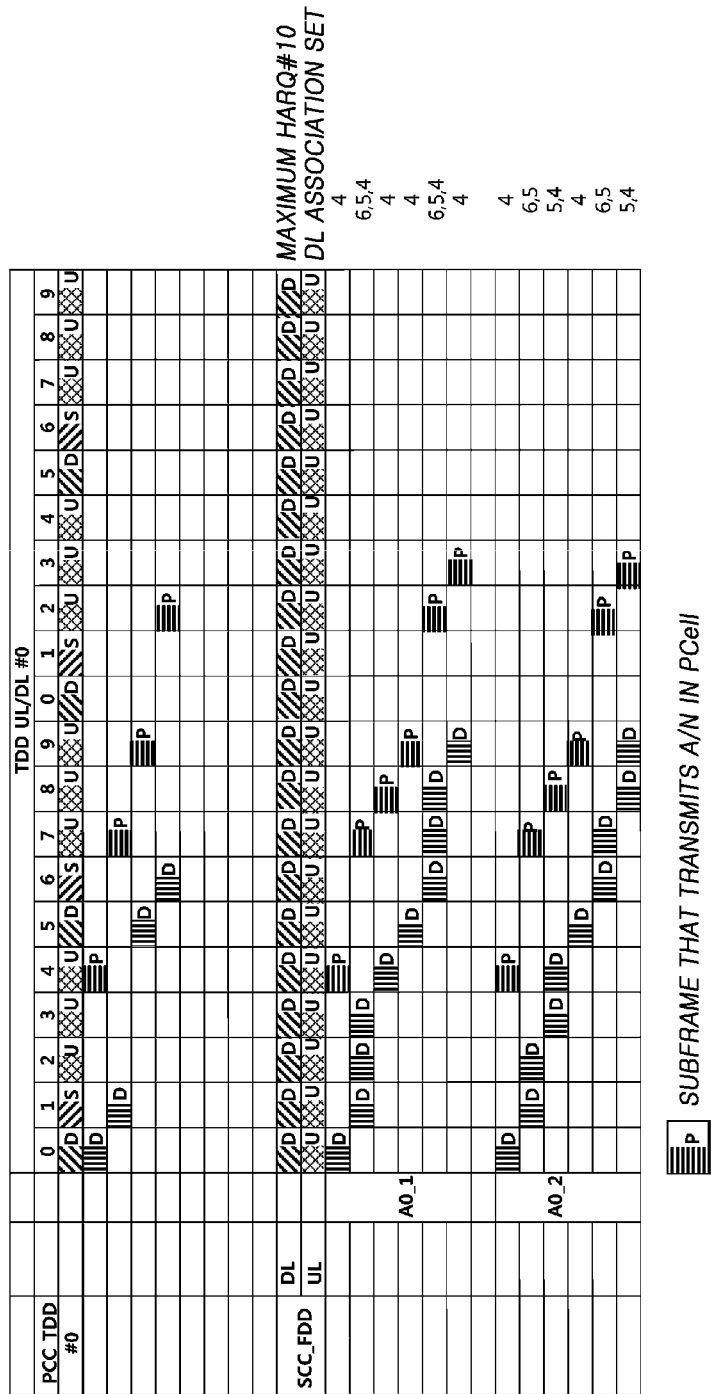
FIGS. 5 to 11 are diagrams illustrating a downlink association set when the duplex mode of a PCell is a TDD mode and the duplex mode of an SCell is an FDD mode according to an embodiment of the present invention.

FIG. 5 shows a downlink association set when a PCell (PCC) has TDD configuration #0 and an SCell (SCC) is configured with FDD, according to an embodiment of the present invention. In association with the PCell having TDD configuration #0, four schemes may exist, which are A0_1, A0_2, A0_3, and A0_4.

In addition to A0_1 and A0_2 downlink association sets as shown in FIG. 5, the case that may create an effect greater than or equal to the TDD performance of Table 2 out of all downlink association sets that can be drawn from the TDD configuration #0 of the PCell will be described as follows.

TABLE 3

Candidates of a downlink association set index when the UL-DL configuration of a PCell is 0

| UL-DL configuration | Subframe n (FDD, SCell) | | | | | | | | | |
|---|---|---|---|---|---|---|---|---|---|---|
| (TDD, PCell) | 0 | 1 | 2 | 3 | 4 | 5 | 6 | 7 | 8 | 9 |
| 0 A0_1 | — | — | 6, 5, 4 | 4 | 4 | — | — | 6, 5, 4 | 4 | 4 |
| A0_2 | — | — | 6, 5 | 5, 4 | 4 | — | — | 6, 5 | 5, 4 | 4 |
| A0_3 | — | — | 6 | 6, 5 | 5, 4 | — | — | 6 | 6, 5 | 5, 4 |
| A0_4 | — | — | 6, 5, 4 | — | 5, 4 | — | — | 6, 5, 4 | — | 5, 4 |

Figure 6:
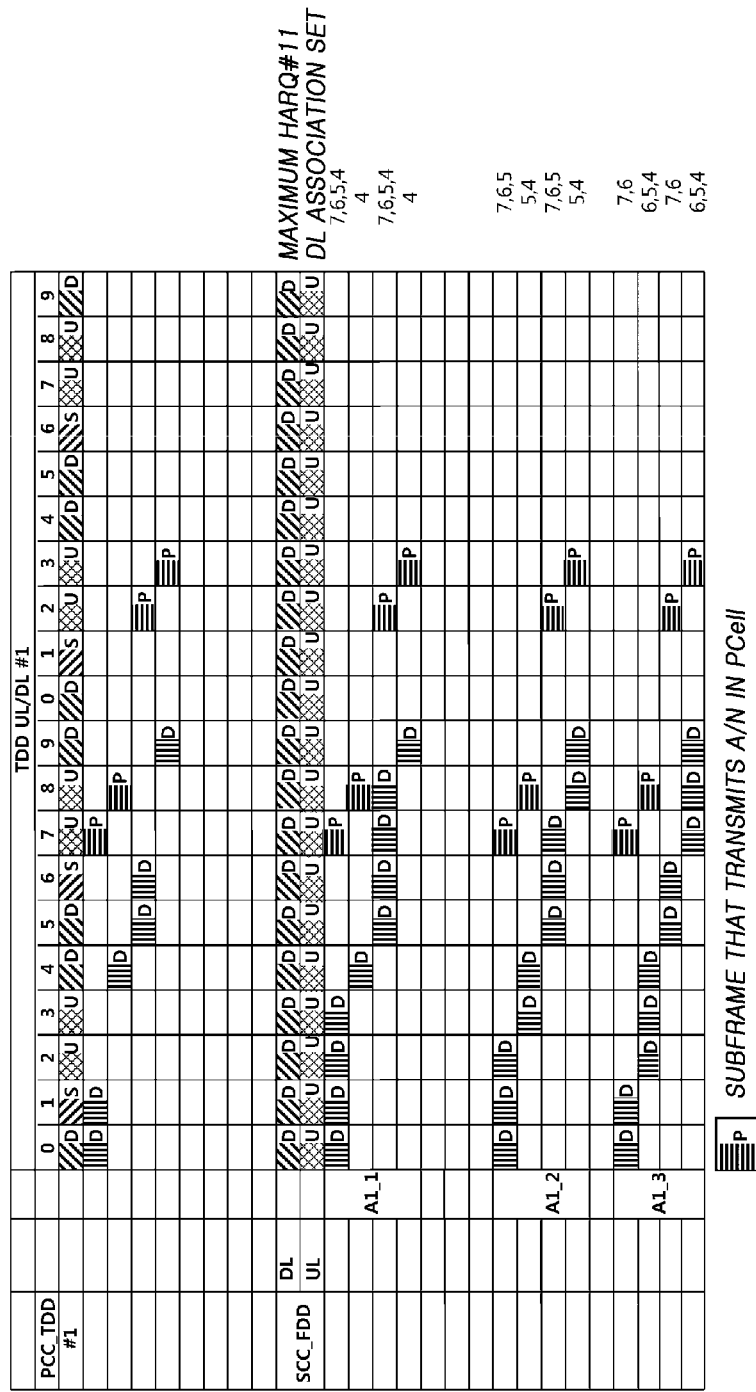

FIG. 6 shows a downlink association set when a PCell (PCC) has TDD configuration #1 and an SCell (SCC) is configured with FDD, according to an embodiment of the present invention. In association with the PCell having TDD configuration #1, four schemes may exist, which are A1_1, A1_2, A1_3, and A1_4.

In addition to A1_1, A1_2, A1_3 downlink association sets as shown in FIG. 6, the case that may create an effect greater than or equal to the TDD performance of Table 2 out of all downlink association sets that can be drawn from the TDD configuration #1 of the PCell will be described as follows.

TABLE 4

Candidates of a downlink association set index when the UL-DL configuration of a PCell is 1

| UL-DL configuration | Subframe n (FDD, SCell) | | | | | | | | | |
|---|---|---|---|---|---|---|---|---|---|---|
| (TDD, PCell) | 0 | 1 | 2 | 3 | 4 | 5 | 6 | 7 | 8 | 9 |
| 1 A1_1 | — | — | 7, 6, 5, 4 | 4 | — | — | — | 7, 6, 5, 4 | 4 | — |
| A1_2 | — | — | 7, 6, 5 | 5, 4 | — | — | — | 7, 6, 5 | 5, 4 | — |
| A1_3 | — | — | 7, 6 | 6, 5, 4 | — | — | — | 7, 6 | 6, 5, 4 | — |
| A1_4 | — | — | 7 | 7, 6, 5, 4 | — | — | — | 7, | 7, 6, 5, 4 | — |

Figure 7:
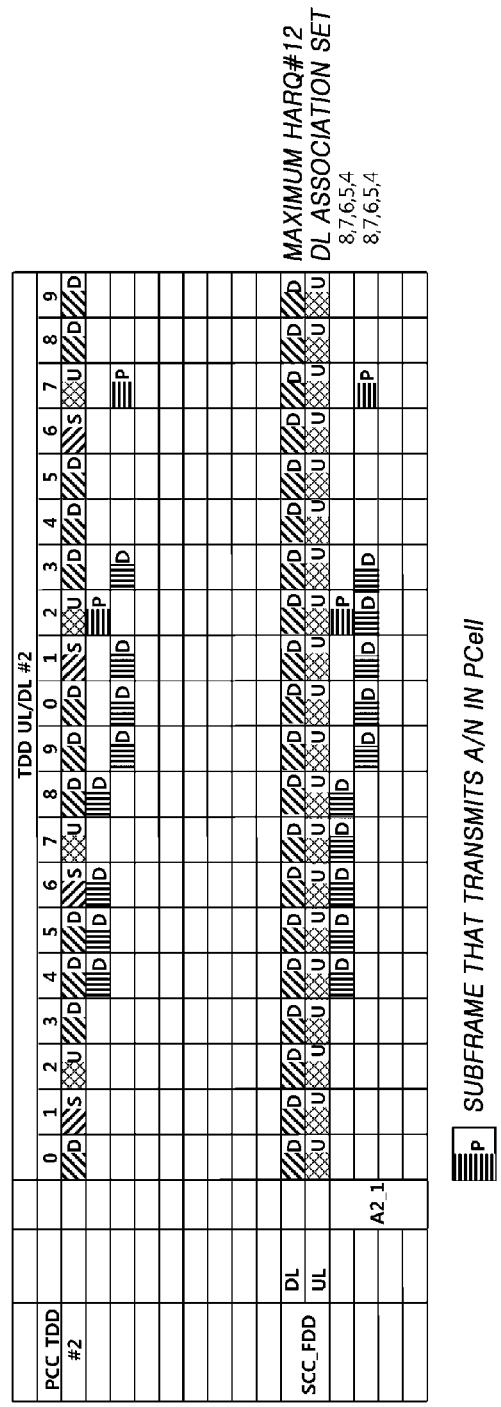

FIG. 7 shows a downlink association set when a PCell (PCC) has TDD configuration #2 and an SCell (SCC) is configured with FDD, according to an embodiment of the present invention. In association with a PCell that has TDD configuration #2, one scheme (A2_1) may exist.

TABLE 5

Candidates of a downlink association set index when the UL-DL configuration of a PCell is 2 (A2_1)

| UL-DL configuration | Subframe n (FDD, SCell) | | | | | | | | | |
|---|---|---|---|---|---|---|---|---|---|---|
| (TDD, PCell) | 0 | 1 | 2 | 3 | 4 | 5 | 6 | 7 | 8 | 9 |
| 2 | — | — | 8, 7, 6, 5, 4 | — | — | — | — | 8, 7, 6, 5, 4 | — | — |

Figure 8:
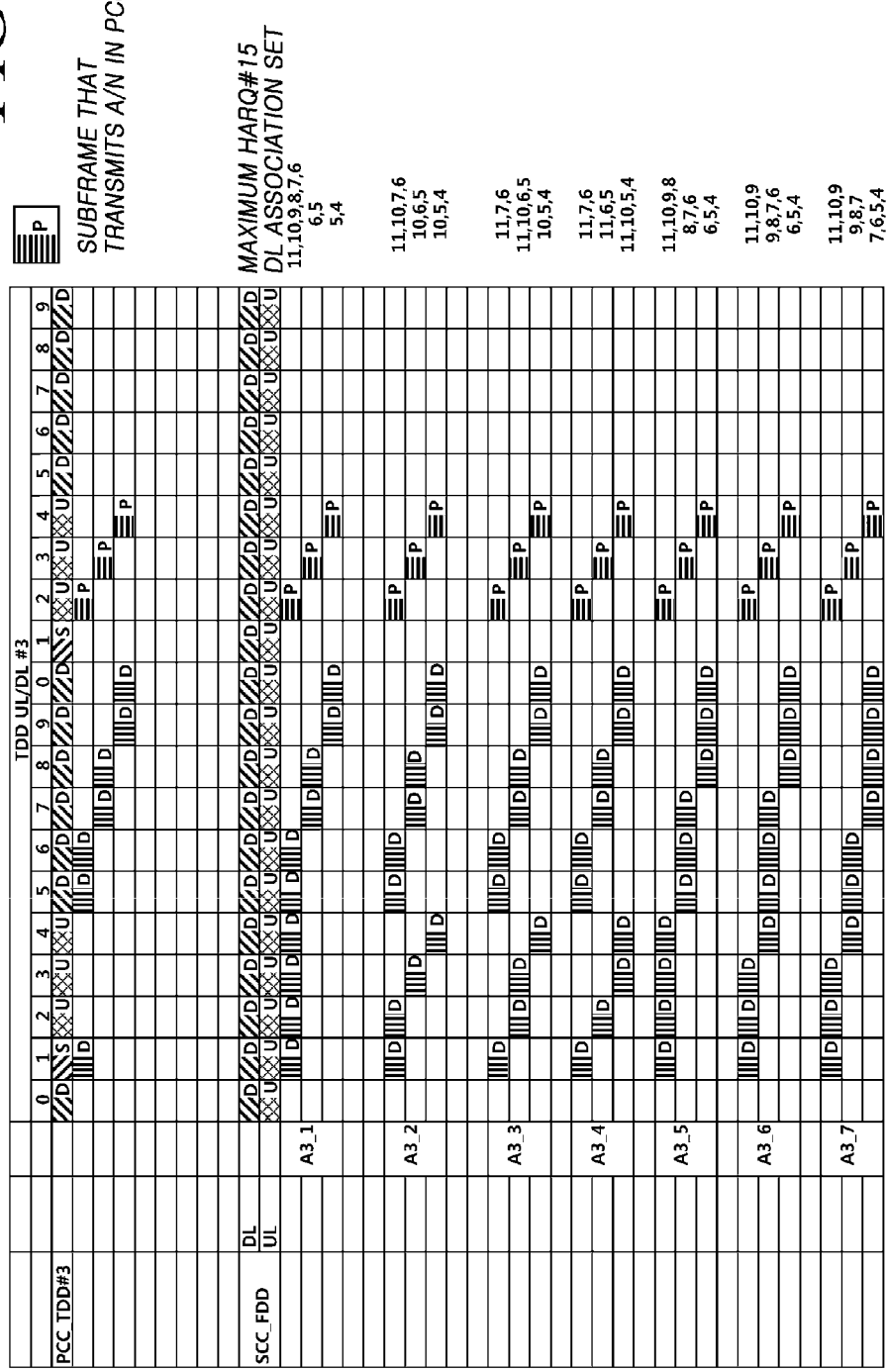

FIG. 8 shows a downlink association set when a PCell (PCC) has TDD configuration #3 and an SCell (SCC) is configured with FDD, according to an embodiment of the present invention. Seven schemes (A3_1, A3_2, A3_3, A3_4, A3_5, A3_6, and A3_7) are provided out of various possible examples in association with a PCell having TDD configuration #3.

In addition to the downlink association sets as shown in FIG. 8, the case that may create an effect greater than or equal to the TDD performance of Table 2 out of all downlink association sets that can be drawn from the TDD configuration #3 of the PCell will be described as follows.

TABLE 6

Candidates of a downlink association set index when the UL-DL configuration of a PCell is 3

| UL-DL configuration | | Subframe n (FDD, SCell) | | | | | | | | |
|---|---|---|---|---|---|---|---|---|---|---|
| (TDD, PCell) | | 0 | 1 | 2 | 3 | 4 | 5 | 6 | 7 | 8 | 9 |
| 3 | A3_1 | — | — | 11, 10, 9, 8, 7, 6 | 6, 5 | 5, 4 | — | — | — | — | — |
|  | A3_2 | — | — | 11, 10, 7, 6 | 10, 6, 5 | 10, 5, 4 | — | — | — | — | — |
|  | A3_3 | — | — | 11, 7, 6 | 11, 10, 6, 5 | 10, 5, 4 | — | — | — | — | — |
|  | A3_4 | — | — | 11, 7, 6 | 11, 6, 5 | 11, 10, 5, 4 | — | — | — | — | — |
|  | A3_5 | — | — | 11, 10, 9, 8 | 8, 7, 6 | 6, 5, 4 | — | — | — | — | — |
|  | A3_6 | — | — | 11, 10, 9 | 9, 8, 7, 6 | 6, 5, 4 | — | — | — | — | — |
|  | A3_7 | — | — | 11, 10, 9 | 9, 8, 7 | 7, 6, 5, 4 | — | — | — | — | — |
|  | A3_8 | — | — | 11, 10, 9, 8, 7 | 7, 6, 5 | 5, 4 | — | — | — | — | — |
|  | A3_9 | — | — | 11, 10, 9, 8 | 8, 7, 6, 5 | 5, 4 | — | — | — | — | — |
|  | A3_10 | — | — | 11, 9, 8, 6 | 11, 8, 6 | 6, 5, 4 | — | — | — | — | — |
|  | A3_11 | — | — | 11, 10, 7, 6 | 10, 9, 6, 5 | 5, 4 | — | — | — | — | — |
|  | A3_12 | — | — | 11, 10 | 10, 9, 8, 7 | 7, 6, 5, 4 | — | — | — | — | — |

Some of the examples are only disclosed, in which HARQ with respect to 10 downlink subframes are distributed to uplink subframes when the UL-DL configuration of a PCell is 3. In addition to the examples shown in Table 6, when a subframe n is 2, 3, or 4, values from 4 to 11 may be allocated as candidates of a downlink association set by taking into consideration a feedback delay. As a matter of course, a value that is greater than 11 may be allocated. However, this may cause a feedback delay in some subframes, and thus, design may be executed by taking into consideration the same.

Figure 9:
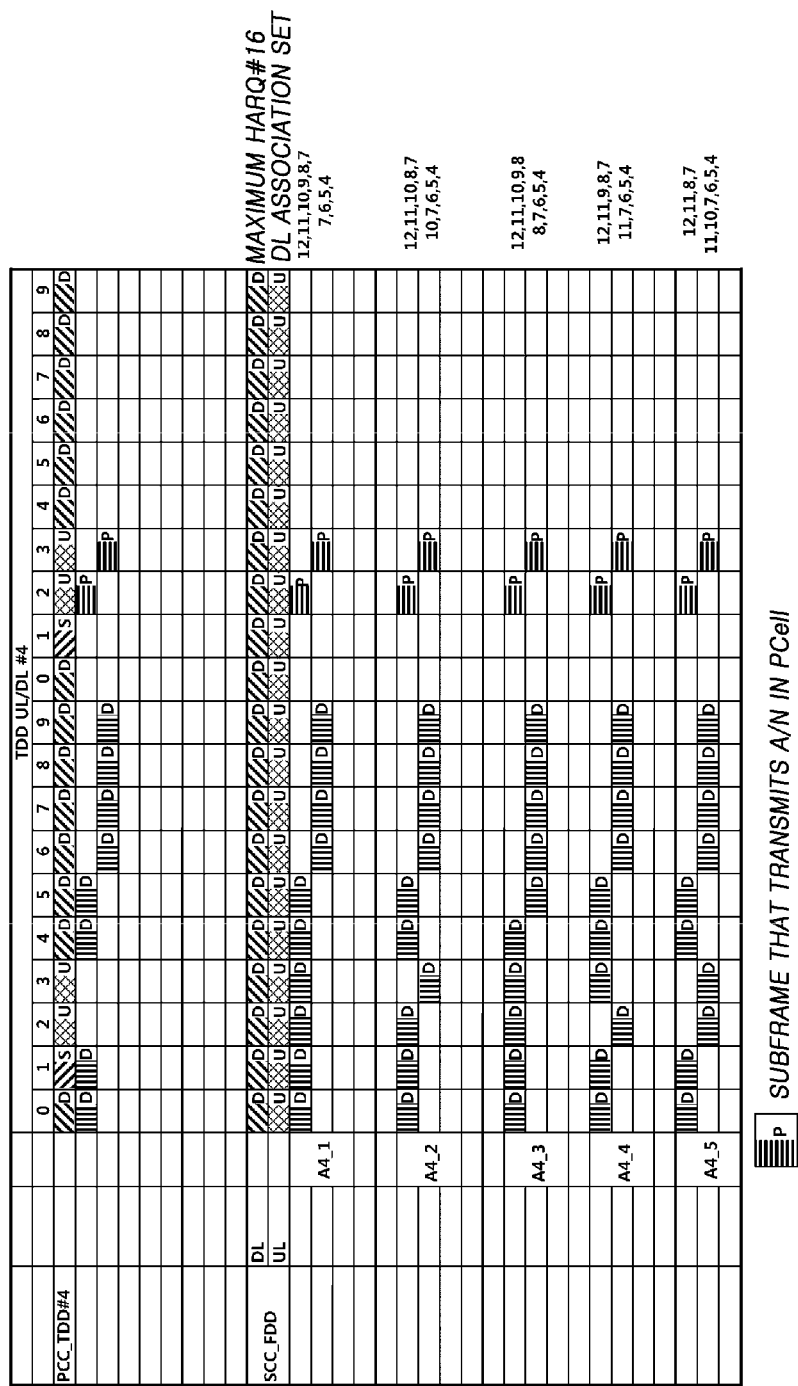

FIG. 9 shows a downlink association set when a PCell (PCC) has TDD configuration #4 and an SCell (SCC) is configured with FDD, according to an embodiment of the present invention. In association with a PCell having TDD configuration #4, five schemes (A4_1, A4_2, A4_3, A4_4, A4_5, A4_6, and A4_7) may exist.

In addition to the downlink association sets as shown in FIG. 9, the case that may create an effect greater than or equal to the TDD performance of Table 2 out of all downlink association sets that can be drawn from the TDD configuration #4 of the PCell will be described as follows.

TABLE 7

Candidates of a downlink association set index when the UL-DL configuration of a PCell is 4

| UL-DL configuration (TDD, PCell) | | Subframe n (FDD, SCell) | | | | | | | | |
|---|---|---|---|---|---|---|---|---|---|---|
| | | 0 | 1 | 2 | 3 | 4 | 5 | 6 | 7 | 8 | 9 |
| 4 | A4_1 | — | — | 12, 11, 10, 9, 8, 7 | 7, 6, 5, 4 | — | — | — | — | — | — |
| | A4_2 | — | — | 12, 11, 10, 8, 7 | 10, 7, 6, 5, 4 | — | — | — | — | — | — |
| | A4_3 | — | — | 12, 11, 10, 9, 8 | 8, 7, 6, 5, 4 | — | — | — | — | — | — |
| | A4_4 | — | — | 12, 11, 9, 8, 7 | 11, 7, 6, 5, 4 | — | — | — | — | — | — |
| | A4_5 | — | — | 12, 11, 8, 7 | 11, 10, 7, 6, 5, 4 | — | — | — | — | — | — |
| | A4_6 | — | — | 12, 11, 10, 9, 7 | 9, 7, 6, 5, 4 | — | — | — | — | — | — |
| | A4_7 | — | — | 12, 11, 10, 7 | 10, 9, 7, 6, 5, 4 | — | — | — | — | — | — |
| | A4_8 | — | — | 12, 10, 9, 7 | 12, 9, 7, 6, 5, 4 | — | — | — | — | — | — |

Some of the examples are only disclosed, in which HARQ with respect to 10 downlink subframes are distributed to uplink subframes when the UL-DL configuration of a PCell is 4. In addition to the examples shown in Table 7, when a subframe n is 2 or 3, values from 4 to 12 may be allocated as candidates of a downlink association set by taking into consideration a feedback delay. As a matter of course, a value that is greater than 12 may be allocated. However, this may cause a feedback delay in some subframes, and thus, design may be executed by taking into consideration the same.

Figure 10:
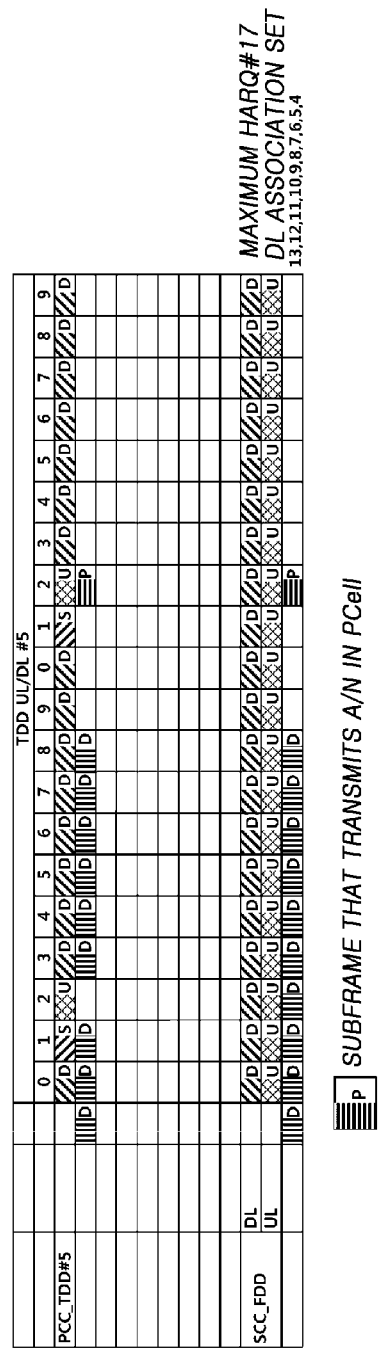

FIG. 10 shows a downlink association set when a PCell (PCC) has TDD configuration #5 and an SCell (SCC) is configured with FDD, according to an embodiment of the present invention. One scheme may exist in association with a PCell that has TDD configuration #5.

TABLE 8

Candidates of a downlink association set index when the UL-DL configuration of a PCell is 5

| UL-DL configuration (TDD, PCell) | Subframe n (FDD, SCell) | | | | | | | | | |
|---|---|---|---|---|---|---|---|---|---|---|
| | 0 | 1 | 2 | 3 | 4 | 5 | 6 | 7 | 8 | 9 |
| 5 | — | — | 13, 12, 11, 10, 9, 8, 7, 6, 5, 4 | — | — | — | — | — | — | — |

Figure 11:
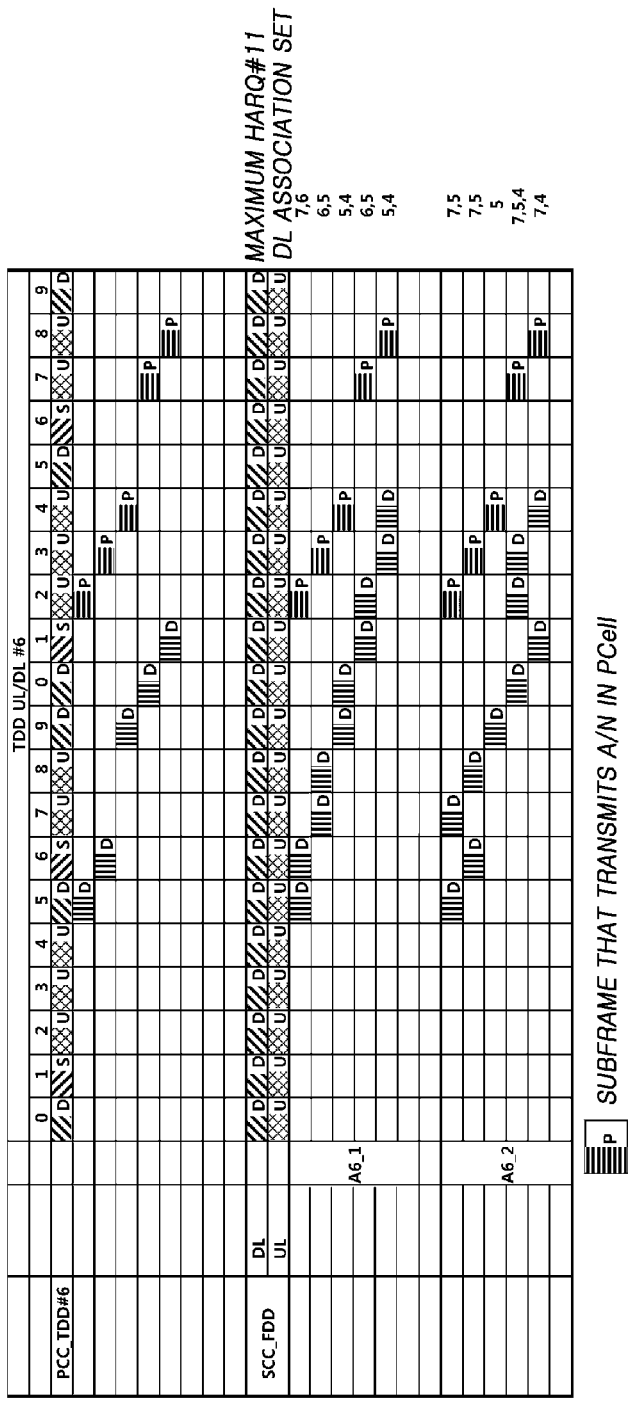

FIG. 11 shows a downlink association set when a PCell (PCC) has TDD configuration #6 and an SCell (SCC) is configured with FDD, according to an embodiment of the present invention. In association with a PCell having TDD configuration #6, two schemes (A6_1 and A6_2) are provided in FIG. 11.

In addition to the downlink association sets as shown in FIG. 11, the case that may create an effect greater than or equal to the TDD performance of Table 2 out of all downlink association sets that can be drawn from the TDD configuration #6 of the PCell will be described as follows.

TABLE 9

Candidates of a downlink association set index when UL-DL configuration of a PCell is 6

| UL-DL configuration (TDD, PCell) | | Subframe n (FDD, SCell) | | | | | | | | |
|---|---|---|---|---|---|---|---|---|---|---|
| | | 0 | 1 | 2 | 3 | 4 | 5 | 6 | 7 | 8 | 9 |
| 6 | A6_1 | — | — | 7, 6 | 6, 5 | 5, 4 | — | — | 6, 5 | 5, 4 | — |
| | A6_2 | — | — | 7, 5 | 7, 5 | 5 | — | — | 7, 5, 4 | 7, 4 | — |
| | A6_3 | — | — | 7 | 7, 6 | 6, 5, 4 | — | — | 6, 5 | 5, 4 | — |
| | A6_4 | — | — | 7, 6 | 6, 5, 4 | 4 | — | — | 6, 5 | 5, 4 | — |
| | A6_5 | — | — | 7, 6 | 6, 5 | 5 | — | — | 7, 5, 4 | 7, 4 | — |
| | A6_6 | — | — | 7, 5 | 7, 5 | 5 | — | — | 7, 6, 5 | 5, 4 | — |
| | A6_7 | — | — | 7, 5 | 7, 5 | 5, 4 | — | — | 6, 4 | 6, 4 | — |
| | A6_8 | — | — | 7, 6 | 6, 5 | 5, 4 | — | — | 6, 4 | 6, 4 | — |

Some of the examples are only disclosed, in which HARQ with respect to 10 downlink subframes are distributed to uplink subframes when the UL-DL configuration of a PCell is 6. In addition to the examples shown in Table 9, when a subframe n is 2, 3, 4, 7, or 8, values from 4 to 7 may be allocated as candidates of a downlink association set by taking into consideration a feedback delay. As a matter of course, a value that is greater than 7 may be allocated. However, this may cause a feedback delay in some subframes, and thus, design may be executed by taking into consideration the same.

To sum up the descriptions that have been provided with reference to FIGS. 5 to 11 and Tables 3 to 9, a table that indicates a DL association set index in association with a DL HARQ timing for FDD, which an eNB-UE that has an PCell configured with TDD should comply with, may be calculated to be Table 10 as provided below.

Figure 12:
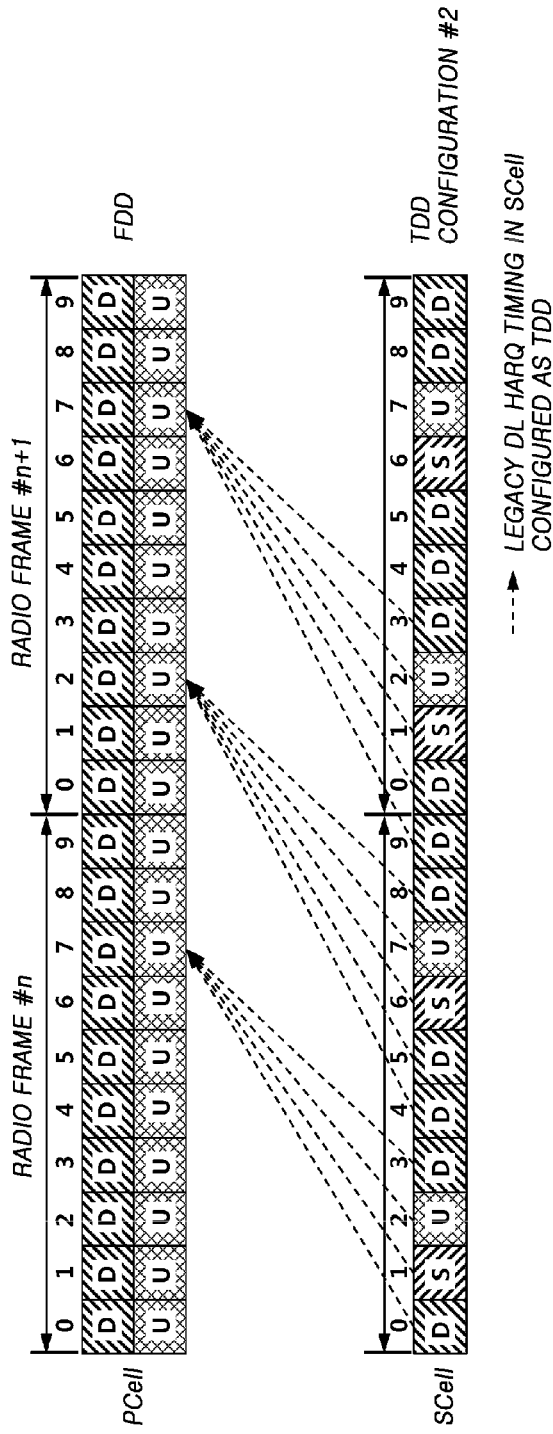
FIG. 12 illustrates a legacy DL HARQ timing.
Figure 13:
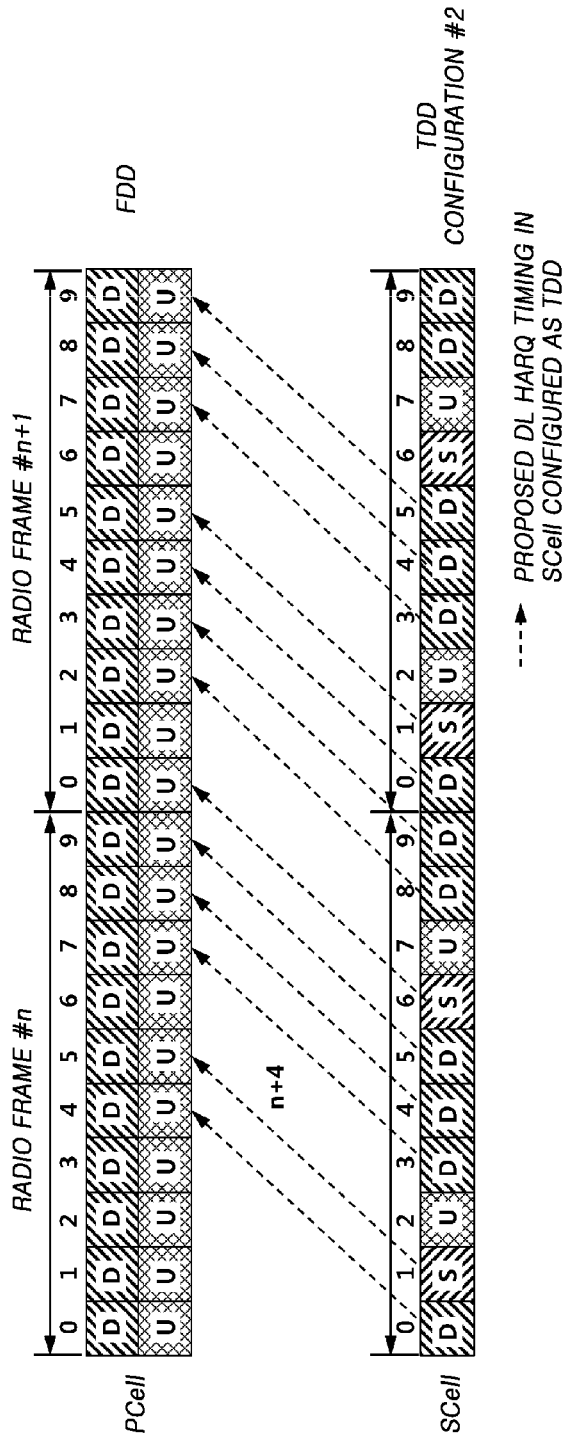
FIG. 13 is a diagram illustrating a HARQ timing when the duplex mode of a PCell is an FDD mode and the duplex mode of an SCell is a TDD mode according to an embodiment of the present invention.

FIG. 13 is a diagram illustrating an embodiment of the present invention to reduce the feedback delay of FIG. 12.

In FIG. 13, a TDD SCell does not comply with DL association set indices corresponding to a TDD UL-DL configuration, but applies an FDD DL HARQ timing. Therefore, all TDD UL-DL configurations apply the FDD DL HARQ timing. That is, a UE receives a PDSCH and transmits HARQ response information in a PCell UL subframe after 4 ms (n+4).

When comparing the examples of FIG. 13 and FIG. 12, a UE that is configured with FDD (PCell)-TDD (SCell) CA supports a relatively quicker DL HARQ operation in a TDD SCell by applying the embodiment of FIG. 13, thereby improving the performance of a system.

Hereinafter, in a UE and a network that provide CA among serving cells that have different duplex modes (TDD-

TABLE 10

Downlink association set index K: $\{k_0, k_1, \ldots, k_{M-1}\}$, in an SCell configured with FDD

| UL-DL configuration | Subframe n (FDD, SCell) | | | | | | | | | |
|---|---|---|---|---|---|---|---|---|---|---|
| (TDD, PCell) | 0 | 1 | 2 | 3 | 4 | 5 | 6 | 7 | 8 | 9 |
| 0 | — | — | 6, 5 | 5, 4 | 4 | — | — | 6, 5 | 5, 4 | 4 |
| 1 | — | — | 7, 6, 5 | 5, 4 | — | — | — | 7, 6, 5 | 5, 4 | — |
| 2 | — | — | 8, 7, 6, 5, 4 | — | — | — | — | 8, 7, 6, 5, 4 | — | — |
| 3 | — | — | 11, 10, 9, 8 | 8, 7, 6 | 6, 5, 4 | — | — | — | — | — |
| 4 | — | — | 12, 11, 10, 9, 8 | 8, 7, 6, 5, 4 | — | — | — | — | — | — |
| 5 | — | — | 13, 12, 11, 10, 9, 8, 7, 6, 5, 4 | — | — | — | — | — | — | — |
| 6 | — | — | 7, 6 | 6, 5 | 5, 4 | — | — | 6, 5 | 5, 4 | — |

As described above, when two or more embodiments exist based on a UL-DL configuration of a PCell, a method that enables DL HARQ response information feedback bits to be transmitted in balance in UL subframes may be preferentially considered and may be applied as shown in Table 10, which is one embodiment, and a DL association set index value may be obtained through a combination of other embodiments of other tables.

In the case of a UE that is configured with cross-carrier scheduling through a TDD PCell, the DL association set index as described above may be used. However, an (E)PDCCH that transmits a DL DCI may be transmitted in a subframe earlier than a subframe n, through which a PDSCH is transmitted, by using cross-subframe scheduling, scheduling bundling, or the like.

A DL HARQ timing for an FDD SCell when TDD is configured as a PCell has been described. Hereinafter, the configuration of a DL HARQ timing for an eNB-UE that is configured with CA where FDD is configured as a PCell and TDD is configured as an SCell will be described.

Unlike the above described CA environment, UL subframes exist in all of the subframes of the PCell, the TDD SCell may not comply with a DL HARQ timing for each existing TDD UL-DL configuration.

FIG. 12 illustrates a legacy DL HARQ timing. FIG. 12 shows a DL HARQ timing for the existing TDD UL-DL configuration #2. In this instance, a TDD SCell does not have a problem in association with a DL HARQ operation, but an unnecessary feedback delay may occur due to a unique characteristic of TDD.

FIG. 13 is a diagram illustrating a HARQ timing when the duplex mode of a PCell is an FDD mode and the duplex mode of an SCell is a TDD mode.

FDD CA), operations and configurations of the UE and a BS to which a downlink HARQ timing for an SCell is applied will be described.

Figure 14:
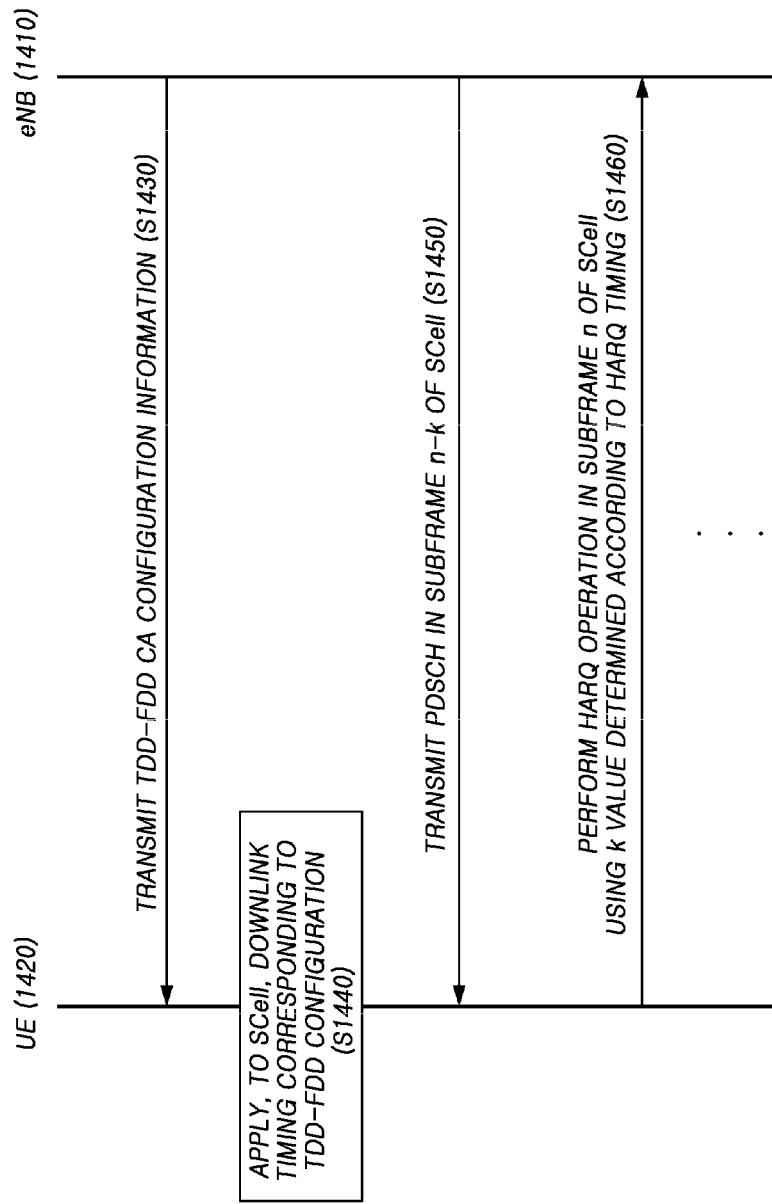
FIG. 14 is a diagram illustrating operations executed between a Base Station (BS) and a User Equipment (UE) according to an embodiment of the present invention.

FIG. 14 is a diagram illustrating operations executed between a BS and a UE according to an embodiment of the present invention. In FIG. 14, an eNB 1410 that is a BS transmits TDD-FDD CA configuration information to a UE 1420 in operation S1430. For example, a PCell may be configured as TDD and an SCell may be configured as FDD. The UE 1420 applies, to an SCell, a downlink timing corresponding to the TDD-FDD CA configuration in operation S1440. As described above, when a plurality of downlink timings are provided in association with a single TDD-FDD CA configuration, a timing of a predetermined scheme may be selected. A timing may be selected based on the duplex mode of a PCell and the duplex mode of an SCell in the TDD-FDD CA configuration.

Subsequently, the eNB 1410 transmits a PDSCH in a subframe n-k of the SCell in operation 1450. The UE calculates a subframe (n−k)+k by adding a determined k value to the subframe through which the PDSCH is transmitted based on the selected HARQ timing, and executes a HARQ operation in a subframe n of the SCell in operation S1460.

Even when CIF is configured for the UE to enable cross-carrier scheduling to be executed through the PCell, an FDD DL HARQ timing, as described above, may be applied to the TDD SCell. That is, irrespective of whether the CIF is configured or not, under the CA as described above, the FDD DL HARQ timing may be equally applied to the PDSCH transmission that is executed in all of the DL subframes of the TDD SCell.

Figure 15:
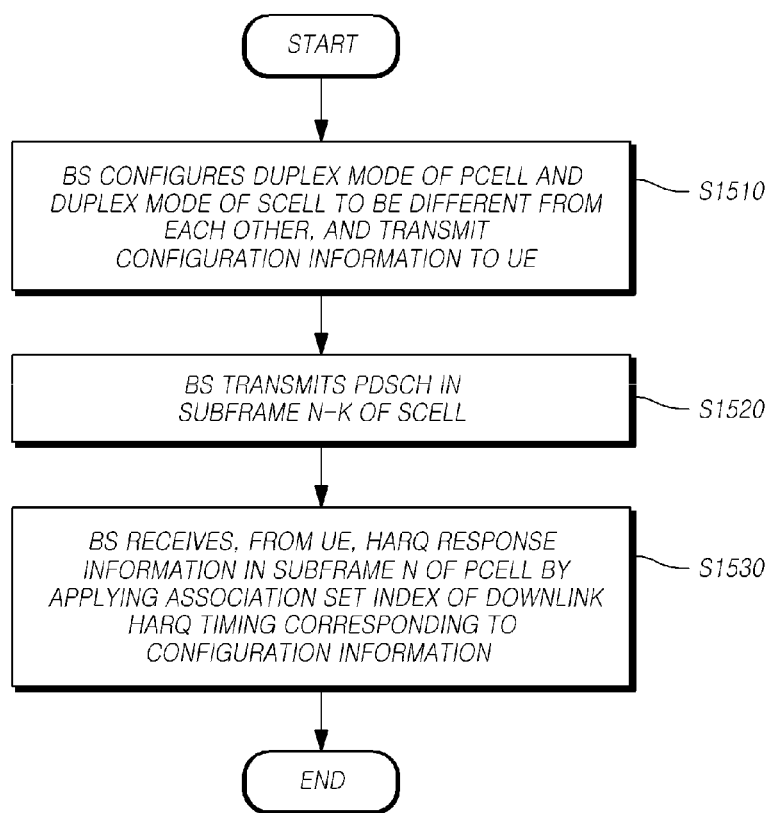
FIG. 15 is a diagram illustrating a process in which a BS controls a downlink HARQ timing in a TDD environment, according to an embodiment of the present invention.

FIG. 15 is a diagram illustrating a process in which a BS controls a downlink HARQ timing in a TDD environment, according to an embodiment of the present invention.

A BS configures the duplex mode of a PCell and the duplex mode of an SCell to be different from each other, and transmits configuration information to a UE in operation S1510. This includes the above-described transmission of TDD-FDD CA configuration information. Subsequently, when the BS transmits a PDSCH in a subframe n-k of the SCell in operation S1520, the UE generates and transmits HARQ response information with respect to the transmitted PDSCH. In this instance, the transmission may apply the above described HARQ timing. That is, the BS applies an association set index of a downlink HARQ timing corresponding to the configuration information, and receives, from the UE, HARQ response information in a subframe n of the PCell in operation S1530, wherein k has a value that is greater than or equal to 4 and less than or equal to 13. As described in FIG. 13 and the related descriptions, when the duplex mode of the PCell is an FDD mode and the duplex mode of the SCell is a TDD mode, k may have a value of 4. Accordingly, the HARQ response information of the TDD SCell is transmitted at a speed that is equal to FDD. Also, when the duplex mode of the PCell is a TDD mode, and the duplex mode of the SCell is an FDD mode, the BS receives HARQ response information with respect to 10 consecutive downlink subframes of the SCell that are dispersively transmitted in one or more uplink subframes in a single radio frame of the PCell. Referring to the embodiments of Table 3 to Table 10 and FIGS. 5 to 11, when the duplex mode of the PCell is a TDD mode, the number of downlink subframes of which downlink association set indices are set for uplink subframes that form a single radio frame is 10. This is applied to all of Table 3 to Table 10. That is, in the case of a conventional downlink association set, such as Table 2, when the UL-DL configuration is 0, downlink subframe indices that are associated with uplink subframes 2, 4, 7, and 9 are 6, 4, 6, and 4. A total of 4 downlink subframes's HARQ indices are included. However, referring to the embodiments of Table 3 to 10 and FIGS. 5 to 11, in the case of downlink association set indices that are allocated to uplink subframes that form a single radio frame, a total of 10 downlink subframe indices are matched for each configuration.

According to an embodiment of the present invention, information associated with a downlink association set index in an SCell that is configured as FDD (that is, a downlink association set index in an SCell corresponding to the TDD configuration of a PCell) may undergo a separate sharing process that is executed between a BS and a UE. To this end, the BS may additionally include a process of transmitting a downlink association set index to the UE.

The downlink association set index k may be the disclosure provided in Table 3 through Table 9. Alternatively, although not disclosed in the tables, the downlink association set index k may be generated to have a value from 4 to 13 and the embodiment thereof may be Table 10.

Figure 16:
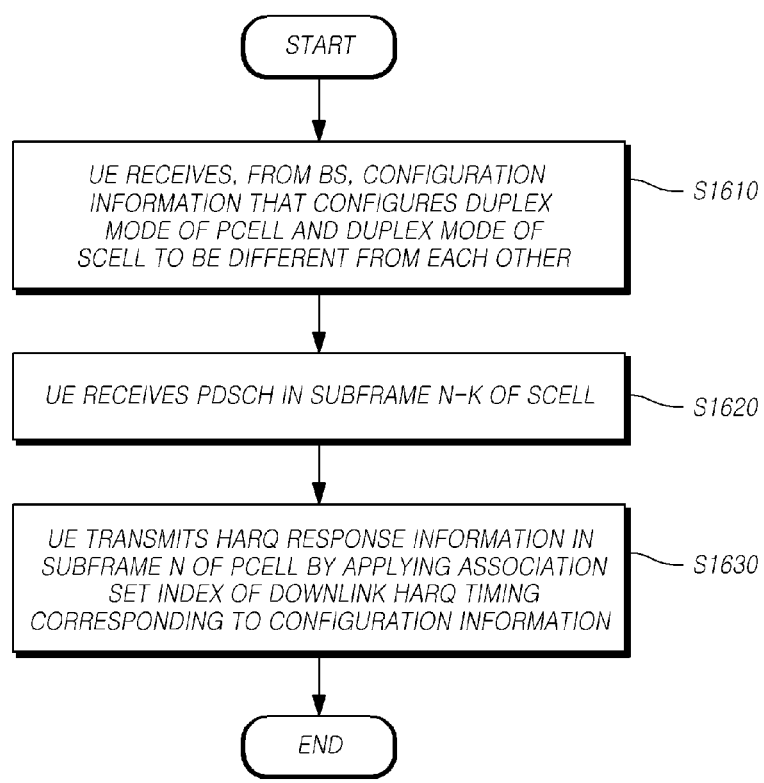
FIG. 16 is a diagram illustrating a process in which a UE controls a downlink HARQ timing in a TDD environment, according to an embodiment of the present invention.

FIG. 16 is a diagram illustrating a process in which a UE controls a downlink HARQ timing in a TDD environment, according to an embodiment of the present invention.

A UE receives, from a BS, configuration information that configures the duplex mode of a PCell and the duplex mode of an SCell to be different from each other, in operation S1610. This includes the above-described reception of TDD-FDD CA configuration information. Subsequently, when the UE receives a PDSCH in a subframe n-k of the SCell in operation S1620, the UE generates and transmits HARQ response information (A/N) with respect to the received PDSCH. The UE applies an association set index of a downlink HARQ timing corresponding to the configuration information, and transmits the HARQ response information in a subframe n of the PCell in operation 1630. In this instance, k has a value that is greater than or equal to 4 and less than or equal to 13.

As described in FIG. 13 and the related descriptions, when the duplex mode of the PCell is an FDD mode and the duplex mode of the SCell is a TDD mode, k may have a value of 4. Accordingly, the HARQ response information of the TDD SCell is transmitted at a speed that is equal to FDD.

Also, when the duplex mode of the PCell is a TDD mode, and the duplex mode of the SCell is an FDD mode, the UE dispersively transmits HARQ response information with respect to 10 consecutive downlink subframes of the SCell in one or more uplink subframes in a single radio frame of the PCell. This has been described with reference to FIG. 15, and thus, the detailed descriptions thereof will be omitted.

According to an embodiment of the present invention, information associated with a downlink association set index in an SCell that is configured as FDD (that is, a downlink association set index in an SCell corresponding to the TDD configuration of a PCell) may undergo a separate sharing process that is executed between the BS and the UE. To this end, the UE may additionally include a process of receiving a downlink association set index from the BS.

The downlink association set index k may be the disclosure provided in Table 3 through Table 9. Alternatively, although not disclosed in the tables, the downlink association set index k may be generated to have a value from 4 to 13 and the embodiment thereof may be Table 10.

Figure 17:
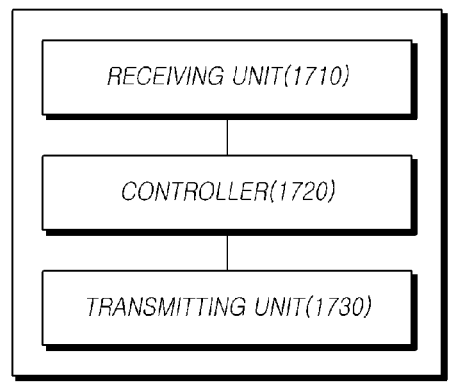
FIG. 17 is a diagram illustrating a configuration of a BS that controls a downlink HARQ timing in a TDD environment, according to an embodiment of the present invention.

FIG. 17 is a diagram illustrating a configuration of a BS that controls a downlink HARQ timing in a TDD environment, according to an embodiment of the present invention.

The configuration of a BS 1700 includes a receiving unit 1710, a controller 1720, and a transmitting unit 1730. The transmitting unit 1730 transmits information or a signal to a UE, and the receiving unit 1710 receives HARQ response information from the UE. The controller 1720 configures the duplex mode of a PCell and the duplex mode of an SCell to be different from each other, and controls the transmitting unit 1730 to transmit the configuration information to a UE. An embodiment of the transmission of the configuration information of the duplex mode may include the transmission of TDD-FDD CA configuration information. The controller 1720 controls the transmitting unit 1730 to transmit a PDSCH in a subframe n-k of the SCell. The UE that receives the transmitted PDSCH may generate and transmit HARQ response information with respect to the transmitted PDSCH. In this instance, the transmission may apply the above-described HARQ timing. That is, the controller 1720 may control the receiving unit 1710 to receive HARQ response information from the UE in the subframe n of the PCell by applying an association set index of a downlink HARQ timing corresponding to the configuration information. In this instance, k has a value that is greater than or equal to 4 and less than or equal to 13.

As described in FIG. 13 and the related descriptions, when the duplex mode of the PCell is an FDD mode and the duplex mode of the SCell is a TDD mode, k may have a value of 4. Accordingly, the HARQ response information of the TDD SCell is transmitted in a speed that is equal to FDD.

Also, when the duplex mode of the PCell is a TDD mode, and the duplex mode of the SCell is an FDD mode, the receiving unit 1710 dispersively receives HARQ response information with respect to 10 consecutive downlink subframes of the SCell, in one or more uplink subframes in a single radio frame of the PCell. Referring to the embodiments of Table 3 to Table 10 and FIGS. 5 to 11, when the duplex mode of the PCell is a TDD mode, the number of downlink subframes of which downlink association set indices are set for uplink subframes that form a single radio frame is 10. This may be applied to all of Table 3 to Table 10, and detailed descriptions thereof will be omitted.

According to an embodiment of the present invention, information associated with a downlink association set index in an SCell that is configured as FDD (that is, a downlink association set index of an SCell corresponding to the TDD configuration of a PCell) may undergo a separate sharing process executed between the BS and the UE. To this end, the transmitting unit 1730 may transmit a downlink association set index to the UE.

The downlink association set index k may be the disclosure provided in Table 3 through Table 9. Alternatively, although not disclosed in the tables, the downlink association set index k may be generated to have a value from 4 to 13, and the embodiment thereof may be Table 10.

Figure 18:
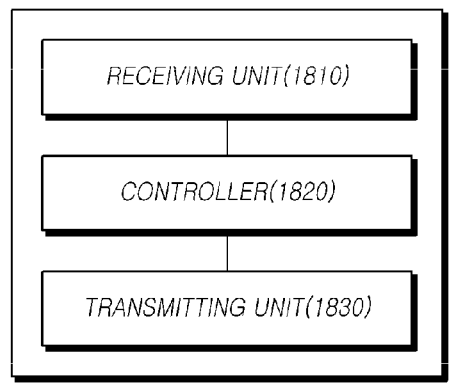
FIG. 18 is a diagram illustrating a configuration of a UE that controls a downlink HARQ timing in a TDD environment, according to an embodiment of the present invention.

FIG. 18 is a diagram illustrating a configuration of a UE that controls a downlink HARQ timing in a TDD environment, according to an embodiment of the present invention.

The configuration of a UE 1800 includes a receiving unit 1810, a controller 1820, and a transmitting unit 1830.

The receiving unit 1810 receives, from a BS, configuration information that configures the duplex mode of a PCell and the duplex mode of an SCell to be different from each other. This includes the above-described reception of TDD-FDD CA configuration information. Also, the receiving unit 1810 receives a PDSCH in a subframe n-k of the SCell. The transmitting unit 1830 transmits information or a signal to the BS. The controller 1820 controls the transmitting unit 1830 to transmit HARQ response information in a subframe n of the PCell by applying an association set index of a downlink HARQ timing corresponding to the configuration information. In this instance, k has a value that is greater than or equal to 4 and less than or equal to 13.

As described in FIG. 13 and the related descriptions, when the duplex mode of the PCell is an FDD mode and the duplex mode of the SCell is a TDD mode, k may have a value of 4. Accordingly, the HARQ response information of the TDD SCell is transmitted at a speed that is equal to FDD.

Also, when the duplex mode of the PCell is a TDD mode, and the duplex mode of the SCell is an FDD mode, the controller 1820 controls the transmitting unit 1830 to dispersively transmit HARQ response information with respect to 10 consecutive downlink subframes of the SCell, in one or more uplink subframes in a single radio frame of the PCell. This has been described with reference to FIG. 15, and thus, the detailed descriptions thereof will be omitted.

According to an embodiment of the present invention, information associated with a downlink association set index in an SCell that is configured as FDD (that is, a downlink association set index in an SCell corresponding to the TDD configuration of a PCell) may undergo a separate sharing process executed between the BS and the UE. To this end, the receiving unit 1810 may receive a downlink association set index from the BS.

The downlink association set index k may be the disclosure provided in Table 3 through Table 9. Alternatively, although not disclosed in the tables, the downlink association set index k may be generated to have a value from 4 to 13 and the embodiment thereof may be Table 10.

By embodying a BS and a UE that have been described through FIGS. 13 to 18, an effective DL HARQ timing for an SCell may be embodied in the TDD-FDD CA scenario, and the performance of the system may be improved.

An embodiment of the present invention embodies a new downlink HARQ timing that may be considered by a UE and a network that supports CA among serving cells that are configured with different duplex modes (FDD and TDD). Particularly, an embodiment of the present invention may improve the performance of downlink by taking into consideration a method for a downlink HARQ timing for an SCell. When an effective DL HARQ timing for an SCell is embodied in the TDD-FDD CA scenario, through the present invention, a feedback delay may be reduced in the SCell, and thus, the performance of the system may be improved.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

The invention claimed is:

1. A method of controlling a downlink HARQ (Hybrid Automatic Retransmit reQuest) timing in a CA (carrier aggregation) environment, the method comprising:

configuring, by a base station (BS), a duplex mode of a PCell (primary cell) to be TDD (time division duplex) and a duplex mode of an SCell (secondary cell) to be FDD (frequency division duplex) and transmitting configuration information to a user equipment (UE);

transmitting, by the BS, a PDSCH (Physical Downlink Shared Channel) transmission in a subframe n-k of the SCell; and receiving, by the BS, HARQ response information associated with the PDSCH transmission in a subframe n of the PCell from the UE, by applying an association set index k of a downlink HARQ timing associated with a UL-DL (uplink-downlink) configuration of the PCell, wherein the value of k for subframe n for UL-DL configurations of the PCell 0, 1, 2, 3, 4, and 5 is in the table as provided below:

| UL-DL configuration (TDD, PCell) | Subframe n (FDD, SCell) | | | | | | | | | |
|---|---|---|---|---|---|---|---|---|---|---|
| | 0 | 1 | 2 | 3 | 4 | 5 | 6 | 7 | 8 | 9 |
| 0 | — | — | 6, 5 | 5, 4 | 4 | — | — | 6, 5 | 5, 4 | 4 |
| 1 | — | — | 7, 6 | 6, 5, 4 | — | — | — | 7, 6 | 6, 5, 4 | — |
| 2 | — | — | 8, 7, 6, 5, 4 | — | — | — | — | 8, 7, 6, 5, 4 | — | — |
| 3 | — | — | 11, 10, 9, 8, 7, 6 | 6, 5 | 5, 4 | — | — | — | — | — |

-continued

| UL-DL configuration (TDD, PCell) | Subframe n (FDD, SCell) | | | | | | | | | |
|---|---|---|---|---|---|---|---|---|---|---|
| | 0 | 1 | 2 | 3 | 4 | 5 | 6 | 7 | 8 | 9 |
| 4 | — | — | 12, 11, 10, 9, 8, 7 | 7, 6, 5, 4 | — | — | — | — | — | — |
| 5 | — | — | 13, 12, 11, 10, 9, 8, 7, 6, 5, 4 | — | — | — | — | — | — | — | transmit a PDSCH (Physical Downlink Shared Channel) transmission in a subframe n-k of the SCell, wherein cross-carrier scheduling of the PDSCH transmission through the PCell is not enabled; and receive HARQ response information associated with the PDSCH transmission in a subframe n of the PCell from the UE, by applying an association set index k of a downlink HARQ timing associated with a UL-DL (uplink-downlink) configuration of the PCell, wherein the value of k for subframe n for UL-DL configurations of the PCell 0, 1, 2, 3, 4 and 5 is in the table as provided below:

| UL-DL configuration (TDD, PCell) | Subframe n (FDD, SCell) | | | | | | | | | |
|---|---|---|---|---|---|---|---|---|---|---|
| | 0 | 1 | 2 | 3 | 4 | 5 | 6 | 7 | 8 | 9 |
| 0 | — | — | 6, 5 | 5, 4 | 4 | — | — | 6, 5 | 5, 4 | 4 |
| 1 | — | — | 7, 6 | 6, 5, 4 | — | — | — | 7, 6 | 6, 5, 4 | — |
| 2 | — | — | 8, 7, 6, 5, 4 | — | — | — | — | 8, 7, 6, 5, 4 | — | — |
| 3 | — | — | 11, 10, 9, 8, 7, 6 | 6, 5 | 5, 4 | — | — | — | — | — |
| 4 | — | — | 12, 11, 10, 9, 8, 7 | 7, 6, 5, 4 | — | — | — | — | — | — |
| 5 | — | — | 13, 12, 11, 10, 9, 8, 7, 6, 5, 4 | — | — | — | — | — | — | — |

2. The method of claim 1, wherein cross-carrier scheduling of the PDSCH transmission through the PCell is not enabled.

3. The method of claim 1, wherein the PDSCH is scheduled by a downlink control information (DCI) in a (e)PDCCH (physical Downlink Control Channel).

4. The method of claim 1, wherein a DL association set is a preferred DL association set by the SCell based on a given PCell_TDD UL-DL configuration.

5. The method of claim 1, wherein the configuration is a TDD-FDD CA configuration.

6. The method of claim 5, wherein the UE is not configured with CIF.

7. The method of claim 1, wherein the configuration information is transmitted on the PCell.

8. A base station (BS) for controlling a downlink HARQ (Hybrid Automatic Retransmit reQuest) timing in CA (carrier aggregation) environment, comprising:
   a radio; and
   a processing element operably connected to the radio and configured to:
      configure a duplex mode of a PCell (primary cell) to be (TDD) time division duplex and a duplex mode of an SCell (secondary cell) to be FDD (frequency division duplex);
      transmit configuration information to a user equipment (UE);

9. The BS of claim 8, wherein the PDSCH is scheduled by a downlink control information (DCI) in a (e)PDCCH (physical Downlink Control Channel).

10. The BS of claim 8, wherein a DL association set is a preferred DL association set by the SCell based on a given PCell_TDD UL-DL configuration.

11. The BS of claim 8, wherein the configuration is a TDD-FDD CA configuration.

12. The BS of claim 11, wherein the UE is not configured with CIF.

13. The BS of claim 8, wherein the configuration information is transmitted on the PCell.

14. An apparatus for controlling a downlink HARQ (Hybrid Automatic Retransmit reQuest) timing of a base station (BS) operating in a CA (carrier aggregation) environment, the apparatus comprising:
   a processing element configured to cause the BS to:
      configure a duplex mode of a PCell (primary cell) to be time division duplex (TDD);
      configure a duplex mode of an SCell (secondary cell) to be FDD (frequency division duplex);
      transmit configuration information to a user equipment (UE);
      transmit a PDSCH (Physical Downlink Shared Channel) transmission in a subframe n-k of the SCell; and
      receive HARQ response information associated with the PDSCH transmission in a subframe n of the PCell from the UE, by applying an association set index k of a downlink HARQ timing associated with a UL-DL (uplink-downlink) configuration of the PCell,
   wherein the value of k for subframe n for UL-DL configurations of the PCell 0, 1, 2, 3, 4 and 5 is in the table as provided below:

| UL-DL configuration (TDD, PCell) | \multicolumn{10}{c}{Subframe n (FDD, SCell)} |
|---|---|---|---|---|---|---|---|---|---|---|
| | 0 | 1 | 2 | 3 | 4 | 5 | 6 | 7 | 8 | 9 |
| 0 | — | — | 6, 5 | 5, 4 | 4 | — | — | 6, 5 | 5, 4 | 4 |
| 1 | — | — | 7, 6 | 6, 5, 4 | — | — | — | 7, 6 | 6, 5, 4 | — |
| 2 | — | — | 8, 7, 6, 5, 4 | — | — | — | — | 8, 7, 6, 5, 4 | — | — |
| 3 | — | — | 11, 10, 9, 8, 7, 6 | 6, 5 | 5, 4 | — | — | — | — | — |
| 4 | — | — | 12, 11, 10, 9, 8, 7 | 7, 6, 5, 4 | — | — | — | — | — | — |
| 5 | — | — | 13, 12, 11, 10, 9, 8, 7, 6, 5, 4 | — | — | — | — | — | — | — |

15. The apparatus of claim 14, wherein the PDSCH is scheduled by a downlink control information (DCI) in a (e)PDCCH (physical Downlink Control Channel).

16. The apparatus of claim 14, wherein a DL association set is a preferred DL association set by the SCell based on a given PCell_TDD UL-DL configuration.

17. The apparatus of claim 14, wherein the configuration is a TDD-FDD CA configuration.

18. The apparatus of claim 17, wherein the UE is not configured with CIF.

19. The apparatus of claim 14, wherein the configuration information is transmitted on the PCell.

20. The apparatus of claim 14, wherein cross-carrier scheduling of the PDSCH transmission through the PCell is not enabled.

* * * * *